United States Patent [19]

Takei et al.

[11] Patent Number: 4,626,045
[45] Date of Patent: Dec. 2, 1986

[54] CONTROL UNIT FOR ANTILOCK BRAKE SYSTEMS

[75] Inventors: Akihiko Takei, Utsunomiya; Etsuo Fujii, Wako, both of Japan

[73] Assignee: Honda Giken Kogyo Kabushiki Kaisha, Tokyo, Japan

[21] Appl. No.: 741,504

[22] Filed: Jun. 5, 1985

[30] Foreign Application Priority Data

| Jun. 7, 1984 | [JP] | Japan | 59-117283 |
| Jun. 8, 1984 | [JP] | Japan | 59-117929 |
| Jun. 9, 1984 | [JP] | Japan | 59-118834 |
| Jun. 9, 1984 | [JP] | Japan | 59-118835 |

[51] Int. Cl.$^4$ .................................................. B60T 8/02
[52] U.S. Cl. ..................................... 303/119; 188/344; 188/358; 251/144
[58] Field of Search ................. 303/119, 1, 6 R, 6 A, 303/10–12, 114, 115, 116, 117, 118, 50–56, 61, 68, 69, 5; 188/355–360, 181 A, 181 R, 344; 91/527, 530; 251/144; 220/82 R; 60/534

[56] References Cited

U.S. PATENT DOCUMENTS

| 3,203,579 | 8/1965 | Reynolds | 220/82 R |
| 3,683,619 | 8/1972 | Belart | 188/359 X |
| 3,928,970 | 12/1975 | Farr | 188/359 X |
| 4,133,287 | 1/1979 | Downs | 220/82 R X |
| 4,340,257 | 7/1982 | Belart | 303/119 X |
| 4,456,310 | 6/1984 | Hayashi et al. | 303/119 X |
| 4,544,075 | 10/1985 | Nakamura | 220/82 R |
| 4,555,144 | 11/1985 | Belart et al. | 303/119 X |

FOREIGN PATENT DOCUMENTS

| 49-26220 | 7/1974 | Japan . |
| 56-160242 | 12/1981 | Japan . |

Primary Examiner—Douglas C. Butler
Attorney, Agent, or Firm—Armstrong, Nikaido, Marmelstein & Kubovcik

[57] ABSTRACT

A control unit used for antilock brake systems, which comprises a support base having a hydraulic channel, an oil tank, and an electro-magnetic valve provided with openings communicating with the hydraulic channel and the oil tank, the valve being supported on the support base and in turn supporting the oil tank. The control unit is characterized in that a support hole and a connecting wall covering the support hole are formed in the bottom wall of the oil tank, the support hole is oil-tightly fitted around the upper end section of electro-magnetic valve and the connecting wall is connected by a screw to a shaft projected from the upper end face of the electro-magnetic valve, and that in the connecting wall is provided a through hole for communicating the inside of the oil tank to the electro-magnetic valve.

17 Claims, 9 Drawing Figures

CONTROL UNIT FOR ANTILOCK BRAKE SYSTEMS

BACKGROUND OF THE INVENTION

1. Field of the Invention

The invention relates to a control unit used for antilock brake systems on automobiles, motorcycles and other vehicles, and particularly to a control unit comprising a support base with hydraulic channels formed therein, an oil tank and electro-magnetic valves which have inlet openings in communication with the hydraulic channels, the valves being supported by the support base and in turn supporting thereon oil tank.

2. Description of the Prior Art

In conventional units as disclosed in Japanese Patent Laid-Open No. 160242/1981, the opening portion in the bottom wall of an oil tank is simply oil-tightly fitted to the upper ends of electro-magnetic valves which are supported on a support base.

With this construction, the supporting strength of the magnetic valves for the oil tank is relatively low, making it difficult to mount an oil tank of a large capacity. Especially when the oil tank is made of a synthetic resin, the oil tank is unable to suppress vibration of the valves which may be caused by repeated opening and closing operations of the valves, and the oil-tightness at the connection of the electro-magnetic valves with the oil tank may be deteriorated due to vibration.

It is also known in the art that there are control units in which, as disclosed in Japanese Patent Publication No. 26220/1974, solenoid valves are clamped from both above and below between a pair of support bases and a pair of clamping plates which are tightly connected together by a plurality of through-bolts, thus constituting a control unit.

In control units of such construction, the clamping plates have to be thick enough so that they will not bend under the tightening force of the through-bolts, since the clamping plates are spaced apart from the support base. The through-bolts also have to be longer than the height of the electro-magnetic valves. As a result the total weight of the unit becomes large; furthermore, there is a disadvantage that the plurality of bolts that stand surrounding the electro-magnetic valves make the outer dimension of the unit large. In addition, in control units of this type, if the hydraulic channel formed in the support base is used for introducing a high pressure oil from the hydraulic pressure source, the hydraulic pressure of that high-pressure hydraulic channel always works on a large area on the end faces of the electro-magnetic valves, developing a thrust load that tends to remove the magnetic valves from the support base. Accordingly, the fixing means as comprising a plurality of through-bolts and clamping plates is subjected to a large load. It is, therefore, necessary that the fixing means be formed with sufficient strength. Also in this case, the weight of the unit is inevitably increased and its size made bulky.

SUMMARY OF THE INVENTION

An object of the invention is to provide a control unit for antilock brake systems of vehicles in which electro-magnetic valves are given a large strength for supporting an oil tank thereon, enabling a tank of large capacity to be mounted on the valves.

Another object of the invention is to provide a control unit of the above type which is further capable, even if an oil tank is made of a synthetic resin, of easily suppressing vibration caused to the electro-magnetic valves.

A further object of the invention is to provide a control unit that is light and compact.

A still further object of the invention is to provide a control unit of the mentioned type which is light and compact and in which irrespective of formation of high-pressure hydraulic channels in a support base, thrust load applied to the electro-magnetic valves by oil pressure in the high-pressure hydraulic channels is reduced to a possible extent to decrease the load on the fixing means.

In order to achieve the above mentioned objects, a control unit for antilock brake systems is provided according to the present invention, the unit comprising a support base provided with an oil channel, an oil tank, and an electro-magnetic valve having openings in communication with the oil channel and the oil tank, respectively, the valve being supported on the support base and in turn supporting the oil tank thereon, wherein a support hole and a connecting wall covering the support hole are formed in a bottom wall of the oil tank, the support hole being oil-tightly fitted around an upper end section of the electro-magnetic valve while the connecting wall being connected by screw means to a projecting shaft which is provided projectingly on an end face of upper end section of the electro-magnetic valve, and wherein the connecting wall is provided with a through-hole communicating an inside of the oil tank to the electro-magnetic valve.

Further, according to the invention, a control unit for antilock brake systems is provided in which the oil tank is made of a synthetic resin and a metallic reinforcing ring which is fitted around upper sections of a plurality of electro-magnetic valves so as to interconnect those valves is fixed to a lower end section of the oil tank.

Further, according to the present invention, a control unit for antilock braking systems is provided in which the support base is provided with a support hole which opens at an upper face of the support base; the electro-magnetic valve, which is fitted at a lower end section thereof into the support hole, is provided with a restraining face facing upwards which is located flush with or below the upper face of the support base; and a pressing plate which retains the restraining face in place is fastened to the upper face of the support base by means of bolts.

Further, according to the invention, a control unit for antilock braking systems is provided, which comprises a support base provided with a high pressure oil channel leading to a hydraulic pressure source and with a control oil channel for introducing an oil pressure to a pressure reduction control chamber operable for reducing braking force of a wheel brake, and an electro-magnetic valve provided with an inlet valve of normally closed type having an inlet and an outlet respectively connected to the high pressure oil channel and the control oil channel, the valve being fastened to the support base through a fastening means, wherein the electro-magnetic valve has a lower end section thereof fitted oil-tightly into a support hole with a bottom which hole is formed in the support base and opens to an upper face of the support base, the high pressure oil channel is opened to a bottom face of the support hole and is fitted oil-tightly with a projecting shaft which is projectingly provided on the lower end section of the electro-magnetic valve and which has the inlet of the inlet valve formed open at an end face thereof, the outlet and the control oil channel are placed in mutual communication through an annular oil chamber defined in the support hole so as to surround the projecting shaft and wherein the pressure receiving area of the projecting shaft as exposed to the high pressure oil channel is set smaller than the pressure receiving area of the electro-magnetic valve which is exposed to said annular oil chamber.

With the arrangement as explained above, the oil tank is supported at two places, that is, at the support hole and the connecting wall, on the electro-magnetic valve, and those two places are separated in the axial direction of the electro-magnetic valve so that the support strength of the electro-magnetic valve is high enough to enable the tank to withstand any bending moments which may develop due to vibration, etc. and that the oil-tightness is secured between the support hole and the electro-magnetic valve, making it feasible to mount thereon an oil tank of large capacity.

Furthermore, though the bottom wall of the oil tank is formed with a large support hole, the rigidity of the wall is strengthened by the connecting wall and its support strength is further increased.

Since supply and receipt of oil between the oil tank and the electro-magnetic valve is effected through a throughhole in the connecting wall, the connecting wall presents no obstacle to the oil flow.

Further, a reinforcing ring is provided, which can impart a vibration damping function to a plurality of electro-magnetic valves, resulting in an enhanced rigidity of synthetic-resin formed oil tank and a reliable seal between each valve and the oil tank. Accordingly, a control unit which is excellent in resisting properties to vibration and impactness is provided even if the oil tank is made of a synthetic resin, and, in addition, the construction of the unit is so much simple.

Further, it is possible for the support base to support the electro-magnetic valve thereon with a pressing plate being placed in intimate contact with the upper face of the support base. As a result, the pressing plate is set free from bending moments caused by tightening force of bolts, which allows use of a relatively thin flat plate as a pressing plate and use of relatively short bolts. This contributes to reduction of weight of the unit. In addition, the unit can be made compact because those bolts do not protrude much above the support base.

Further, it is possible to reduce the load of fastening means for the electro-magnetic valve by minimizing thrust load to be applied to the electro-magnetic valve by the hydraulic pressure, irrespective of formation of a high pressure oil channel and a control oil channel in the support base. Therefore, the strength of fastening means can be decreased to make the control unit lightweighted and compact.

The above and other objects and advantageous features of the invention will be apparent from the detailed description below of embodiments of the invention in reference to the accompanying drawings.

DETAILED DESCRIPTION OF PREFERRED EMBODIMENTS

Figure 1:
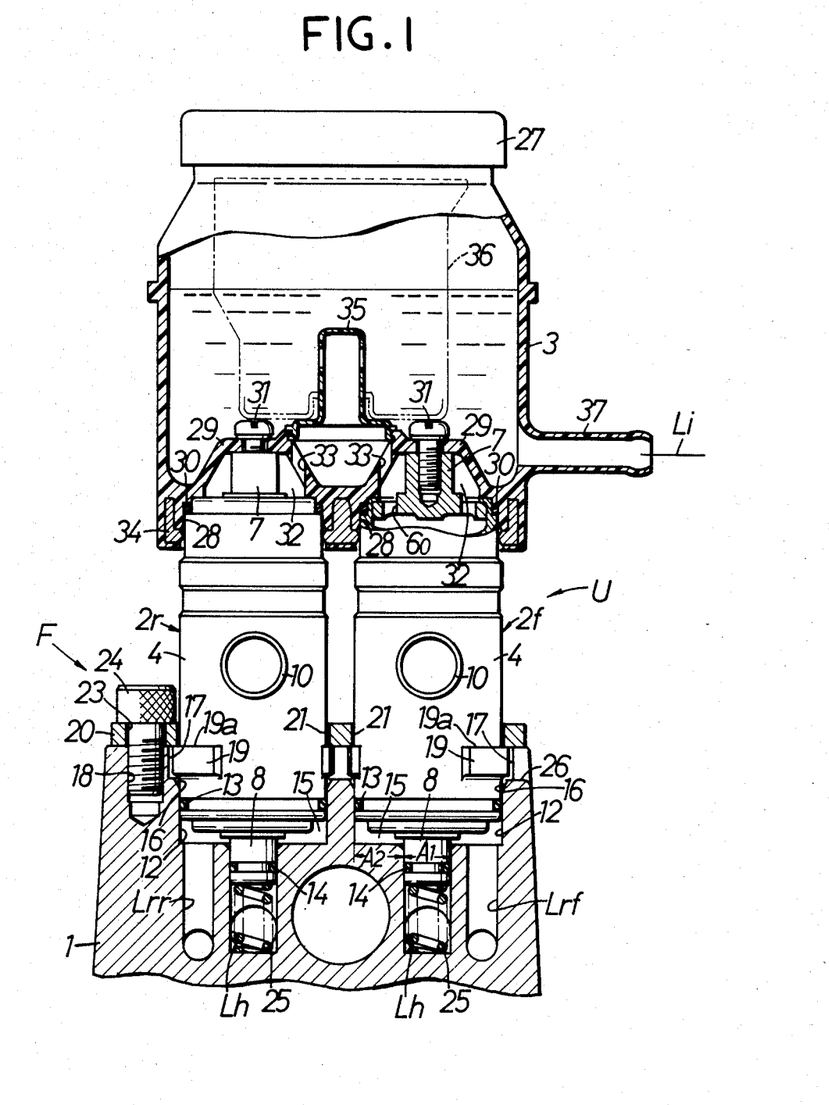
FIG. 1 through FIG. 6 show a first embodiment of the invention, FIG. 1 showing a front view thereof with a main portion in cross section, FIG. 2 a plan view with an oil tank being removed, FIG. 3 a plan view of a support base, FIG. 4 a plan view of a pressing plate, FIG. 5 a plan view of electro-magnetic valves and FIG. 6 a schematic view of the internal construction of electro-magnetic valves and the hydraulic circuit around the valves.
Figure 2:
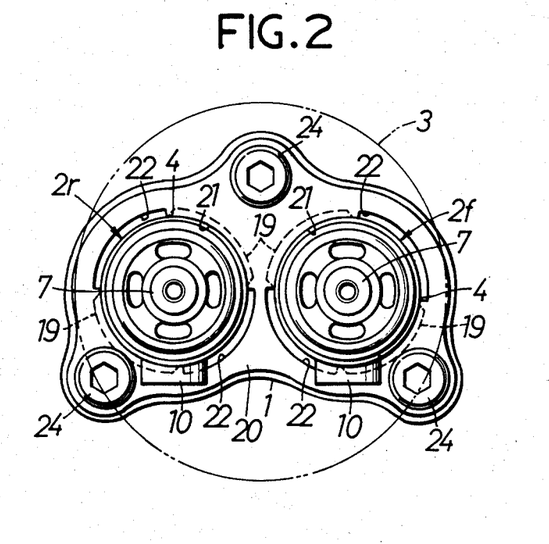
Figure 4:
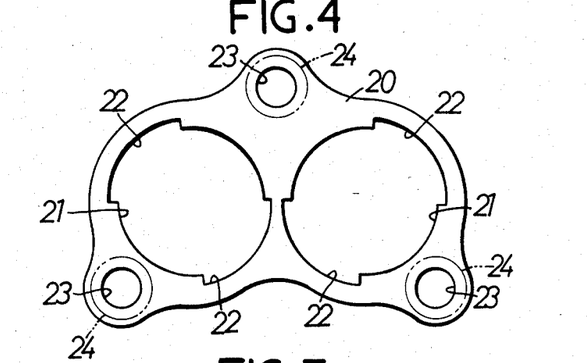
Figure 5:
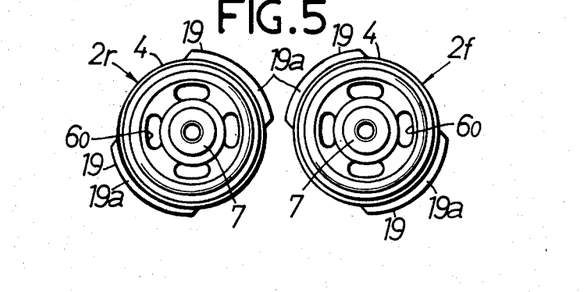
Figure 6:
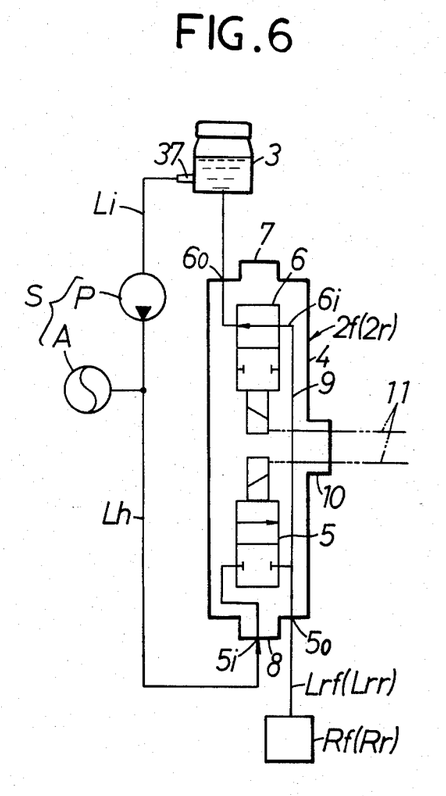

FIG. 1 through FIG. 6 show a first embodiment of the invention. In FIG. 1, a control unit U used for an antilock brake system of an automobile consists of a support base 1 which is supported on an automobile body (not shown), a front wheel brake system control electro-magnetic valve 2f and a rear wheel brake system control electro-magnetic valve 2r which are supported on the base 1 and stand upright in parallel, and an oil tank 3 that is supported on both electro-magnetic valves 2f and 2r. The support base 1 is provided therein with a high pressure hydraulic channel Lh communicating with a common oil source S which, as shown in FIG. 6, comprises a hydraulic pump P and a pressure accumulator A, and with control oil channels Lrf and Lrr communicating respectively with pressure reduction control chambers Rf and Rr of modulators for front and rear wheel brake systems.

Since both electro-magnetic valves 2f and 2r are basically of the same construction, the description here refers only to the construction of the electro-magnetic valve 2f for the front wheel brake system by also reference to FIG. 6. The electro-magnetic valve 2f is constituted of a cylindrical valve body 4 accommodating therein a normally-closed inlet valve 5 and a normally-open outlet valve 6 arranged upwardly of the inlet valve 5. At upper and lower faces of the valve body 4 are integrally projected respective projecting shafts 7 and 8 upwardly and downwardly from the central portion of the valve body 4. An inlet 5i of the inlet valve 5 opens at the lower end face of the projecting shaft 8 and communicates with the high pressure oil channel Lh, and its outlet 5o opens at the lower end face of the valve body 4 and communicates with the control hydraulic channel Lrf. An inlet 6i of the outlet valve 6 communicates with the outlet 5o of the inlet valve 5 through a hydraulic channel 9 in the valve body 4, and an outlet 6o of the outlet valve 6 opens at the upper end face of the valve body 4 and communicates with the inside of oil tank 3.

One side face of the valve body 4 is projectingly provided with a lead wire take-out tube 10. Lead wires 11, 11 connected to respective solenoids of the inlet valve 5 and the outlet valve 6 are led outside through the take-out tube 10.

As shown in FIG. 1 the lower ends of the valve bodies 4 and 4 of the electro-magnetic valves 2f and 2r are oil-tightly fitted through seal rings 13 and 13 into respective support holes 12 and 12 provided in the support base 1 in a bottomed cylindrical shape. The lower projecting shafts 8 and 8 are fitted through seal rings 14 and 14 into the high pressure oil channels Lh and Lh which open to the bottom centers of the support holes 12 and 12. At each support hole 12 is defined an annular oil chamber 15 by the lower end face of the valve body 4 so as to surround the projecting shaft 8. The outlet 5o of the inlet valve 5 communicates with the control oil channel Lrf (Lrr) through the oil chamber 15.

Here, the pressure-receiving area $A_1$ of the projecting shaft 8 which is exposed to the high pressure oil channel Lh is made smaller than the pressure-receiving area $A_2$ of the electro-magnetic valve $2f$ ($2r$) as exposed to the annular oil chamber 15.

Figure 3:
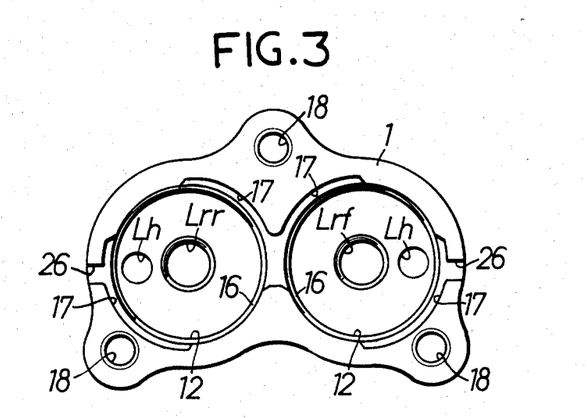

The support base 1 is provided, as shown in FIG. 3, with tapered guide sections 16 which lead to the upper ends of the support holes 12, a pair of cut-outs 17 and 17 which are connected to the upper ends of the tapered guide sections 16 and are opposed each other, and a plurality of threaded holes 18 and 18 which are disposed adjacent the outer portions of those cut-outs 17 and 17. On the other hand, each valve body 4 is integrally formed with a pair of flanges 19 which project below the lead wire take-out tubes 10 in opposite directions as shown in FIG. 5. Those flanges 19 and 19 are fitted into the cut-outs 17 and 17 and they are pressed down by a pressing plate 20 which is fastened to the support base 1 by means of a plurality of bolts 24, 24. Accordingly the upper faces 19a and 19a of the flanges 19 and 19 serve as restraining faces that are retained under the pressing plate 20.

Here the depth of the cut-outs 17 and 17 are set so as to make the restraining faces 19a and 19a flush with or located below the upper face of the support base 1. The pressing plate 20 can thereby be pressed firmly against the upper face of the support base 1 when the flanges 19 and 19 are pressed down.

The pressing plate 20 is provided, as shown in FIG. 4, with mounting holes 21 into which valve bodies 4 can loosely fit, a pair of cut-outs 22 and 22 which are open to the mounting holes 21 and 21 through which the flanges 19 and 19 can pass, and a plurality of bolt holes 23, 23 which correspond to the holes 18, 18. Each cut-out 22 is angularly offset by 90° around the axis of the valve body 4 with respect to the corresponding cut-out 17 in the support base 1.

Thus, the flanges 19, the pressing plate 20, and the bolts 24 constitute a fastening means F for the electro-magnetic valves $2f$ and $2r$.

In order to eliminate any play in the vertical direction of the electro-magnetic valves $2f$ and $2r$ in mounted state thereof, springs 25 and 25 urging upwards the lower projecting shafts 8 and 8 are accommodated in the high-pressure oil channels Lh and Lh.

Each cut-out 17 is open to the outside face of the support base 1 through a water drain groove 26 to prevent rain water or other liquids from remaining in the cut-out 17.

Again in FIG. 1, the oil tank 3 is formed of a synthetic resin, and it is provided with a cap 27 at its upper portion. In the bottom wall of the oil tank 3, a pair of support holes 28 and 28, and truncated-conical shaped connecting walls 29 and 29 covering respective support holes 28 and 28 are formed. The upper end sections of the electro-magnetic valves $2f$ and $2r$ are oil-tightly fitted into the support holes 28 and 28 through seal rings 30 and 30, and connecting walls 29 and 29 are connected to the upper projecting shafts 7 and 7 of the electro-magnetic valves $2f$ and $2r$ by means of machine screws 31 and 31 which are screwed from inside of the oil tank 3. In this connection the electro-magnetic valves $2f$ and $2r$ are supported on the support base 1 irrotatably due to fitting engagement of the flanges 19 and 19 with the cut-outs 17 and 17, as mentioned above, so that the valves $2f$ and $2r$ are in unison with the screws 31 and 31, which makes tightening of the screws easy and certain.

Below each connecting wall 29 an annular oil chamber 32 is defined by the upper end face of the valve body 4, and the oil chamber 32 is connected to the outlet 6o of the outlet valve 6. A through-hole 33 is provided in each connecting wall 29 in order to communicate the oil chamber 32 with the oil tank 3. Accordingly the oil tank 3 and the outlet 6o of the outlet valve 6 communicate through the through-hole 33 and the oil chamber 32.

To the lower end of the oil tank 3 a metallic reinforcing ring 34 is attached by insertion or threading, and this reinforcing ring 34 is fitted around the outer circumferences of the valve bodies 4 and 4 of both electro-magnetic valves $2f$ and $2r$ in order to interconnect the upper ends of the valve bodies 4 and 4.

Since the paired electro-magnetic valves $2f$ and $2r$ have their upper end sections connected through the metallic reinforcing ring 34 which is fixed onto the lower section of the oil tank 3, one of the valves can damp any vibration of the other through the reinforcing ring when the other valve $2f$ or $2r$ vibrates due to repeated opening and closing operations. Furthermore, resistance properties of the oil tank to vibration and impactness can be increased since the reinforcing ring 34 gives rigidity to the tank 3 made of a synthetic resin. As a result, deformation of the seal rings 30 and 30 and the oil tank 3 can be prevented, and the oil-tightness between the electro-magnetic valves $2f$ and $2r$ and the oil tank 3 can also be secured.

In the oil tank 3 a damping tube 35 is mounted on the connecting walls 29 and 29 so as to cover the through-holes 33 and 33. This damping tube is adapted for damping the spouting of oil out of the through-holes 33 to prevent formation of air bubbles in the oil.

Thus since the oil tank 3 is supported by the electro-magnetic valves $2f$ and $2r$ at the two support holes 28 and 28 and the two connecting walls 29 and 29, and since those two positions are apart in the axial directions of the electro-magnetic valves $2f$ and $2r$, the support strength of the valves for the oil tank 3 is large, and the tank 3 can sufficiently withstand bending moments which may be exerted on the oil tank 3 due to vibration of the valves or the like, and the oil-tightness between the support holes 28 and 28 and electro-magnetic valves $2f$ and $2r$ can be secured.

Although the bottom wall of the tank 3 has large support holes 28 and 28 formed thereat, its rigidity is increased by the connecting walls 29 and 29, and those walls further enhance the support strength of the oil tank 3.

Supply and receipt of oil between the oil tank 3 and electro-magnetic valves $2f$ and $2r$ is effected through the through-holes 33 and 33 in the connecting walls 29 and 29, and those walls 29 and 29 present no obstacle to the oil flow.

The number 36 in FIG. 1 shows a filter, 37 a connecting pipe connected to an inlet oil channel Li that leads to the hydraulic pump P.

In order to mount electro-magnetic valves $2f$ and $2r$ on the support base 1, first the lower sections of the electro-magnetic valves $2f$ and $2r$ are fitted into the mounting holes 21 and 21 of the pressing plate 20 from above the plate 20. In this insertion, after the flanges 19 and 19 have passed the cut-outs 22 and 22, the electro-magnetic valves $2f$ and $2r$ are respectively rotated by 90° around their axes to angularly displace the flanges 19 and 19 relative to the cut-outs 22 and 22 of the pressing plate 20. This angular positions of the flanges will meet the positions of the cut-outs 17 and 17 in the support base 1. The pressing plate 20 can thus be mounted to the electro-magnetic valves 2f and 2r without interference from the lead wire take-out pipes 10 and 10.

Next, the lower ends of the electro-magnetic valves 2f and 2r are fitted into the support holes 12 and 12 of the support base 1 and the flanges 19 and 19 into the cut-outs 17 and 17, and the bolts 24, 24 are inserted through the bolt holes 23, 23 of the pressing plate 20 and are screwed into the screw holes 18 and 18 of the support base 1.

The electro-magnetic valves are now reliably supported on the support base 1 by their fitting to the support holes 12 and 12 and by the function of the pressing plate 20 to retain the pressure faces 19a and 19a at the upper face of the flanges 19 and 19.

Since the above mentioned pressure faces 19a and 19a is flush with or located below the upper face of the support base 1, the pressing plate 20 is fastened tightly to the upper face of the support base 1 so that the tightening forces of the bolts 24 and 24 can be prevented from working as bending moments to the pressing plate 20. Accordingly the pressing plate 20 can be formed relatively thin, and the bolts 24 and 24 can be made short in length.

During braking of a vehicle, the inlet valve 5 is kept closed and the outlet valve 6 is kept open to place the pressure reduction control chamber Rf (Rr) in communication with the oil tank 3, if the inlet valve 5 and the outlet valve 6 are not magnetised. In this case, the braking force in the front (rear) brake system is not reduced. However, when the front (rear) wheels are about to be locked, the inlet valve 5 and the outlet valve 6 are magnetised by the signal outputted from a command device (not shown), firstly the outlet valve 6 is closed, and then the inlet valve 5 is opened to shut off the communication between the pressure reduction control chamber Rf (Rr) and the oil tank 3 and at the same time the pressure reduction control chamber Rf (Rr) is communicated with the high pressure hydraulic channel Lh. Then hydraulic pressure is introduced from the hydraulic pressure source S to the control chamber Rf (Rr), and thereby the braking force applied to the front (rear) wheels is decreased to avoid occurrence of locking in the braking system.

Incidentally the hydraulic pressure from the hydraulic pressure source S always works on the end faces of projecting shafts 8 of the electro-magnetic valves 2f and 2r through the high pressure oil channel Lh, but since the pressure-receiving area $A_1$ of the projecting shaft 8 has been made smaller than the area $A_2$ of the electro-magnetic valve 2f or 2r facing the annular oil chamber 15, thrust load to the electro-magnetic valve 2f or 2r is small, even if the oil pressure from the hydraulic pressure source is high.

When the inlet valves 5 of the electro-magnetic valves 2f and 2r are opened, the lower end faces of the electro-magnetic valves 2f and 2r are subjected to oil pressure in the annular oil chambers 15 during the time at which the oil pressure from the hydraulic pressure source S is transmitted through the inlet valves 5 to the pressure reduction control chamber Rf (Rr). But the oil pressure in the annular oil chamber 15 has been more or less damped while it passes through the inlet valve 5 so that the pressure in the chamber 15 is lower than the oil pressure in the hydraulic pressure source. And since the time while the inlet valve 5 is open is very short, the time in which the hydraulic pressure works in the annular oil chamber 15 is also very short, the thrust load applied to the electro-magnetic valves 2f and 2r is made smaller than when the hydraulic pressure of the hydraulic pressure source works directly on the annular oil chamber 15, and the time of working of the load is also extremely short. As a result, the load applied to the fastening means F is reduced.

However, the positioning of bolts 24, 24 close to the flanges 19 and 19 is effective in preventing deformation as far as possible of the pressing plate 20.

Figure 7:
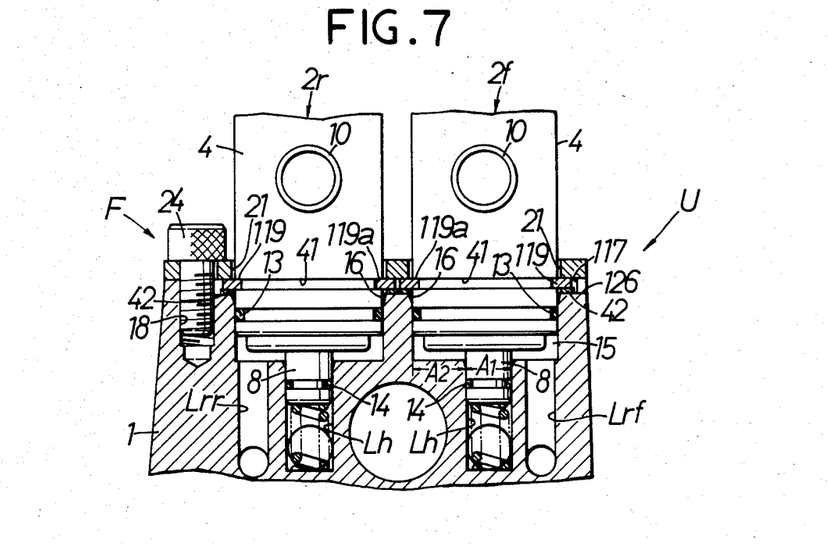
FIG. 7 and FIG. 8 show a second embodiment of the invention, FIG. 7 showing a fragmentary front view thereof with a main part in cross section, and FIG. 8 a plan view of a support base.
Figure 8:
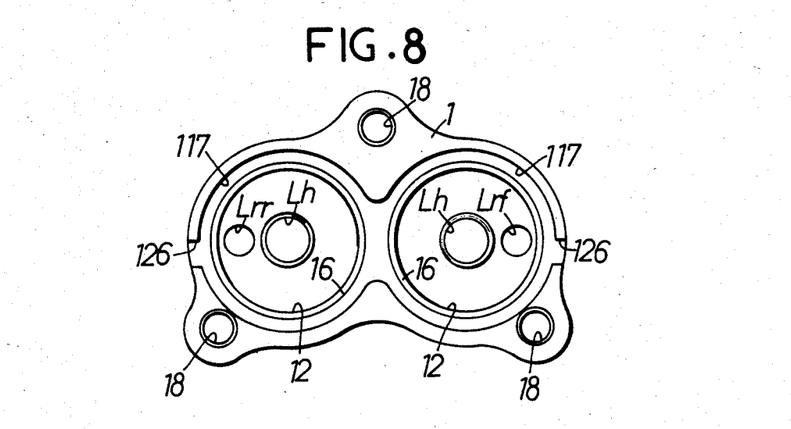

FIG. 7 and FIG. 8 show a second embodiment of the invention. The fastening means for the electro-magnetic valves 2f and 2r is different from the foregoing embodiment in its construction. In place of the flanges 19 and 19 of the foregoing embodiment circlips 119, 119 are retained in circumferential grooves 41, 41 and their upper faces serve as restraining faces 119a, 119a which are pressed down. The pressing plate 20 is fitted on the electro-magnetic valves 2f and 2r before the circlips 119 and 119 are mounted. Accordingly the mounting holes 21 and 21 in the pressing plate 20 may be simply shaped circle like the cross sections of the valve bodies 4, 4.

In place of the cut-outs 17 and 17 annular recessed sections 117 and 117 are provided on the support base 1, which are formed so as to enclose the guiding tapered sections 16 and 16. The circlips 119 and 119 which engage the electro-magnetic valves 2f and 2r are fitted in the annular recessed sections 117 and 117 together with the flat washers 42 and 42. 126 is a drain groove for the annular recessed section 117.

Since other construction of the embodiment is the same as the foregoing embodiment, parts that correspond to those of the above embodiment are given the same reference numbers and symbols.

When the bolts 24, 24 are screwed into the holes 18, 18, the pressing plate 20 presses the upper faces of the circlips 119 and 119, that is, the restraining faces 119a and 119a, so that it is possible to secure the electro-magnetic valves 2f and 2r onto the support base 1.

Figure 9:
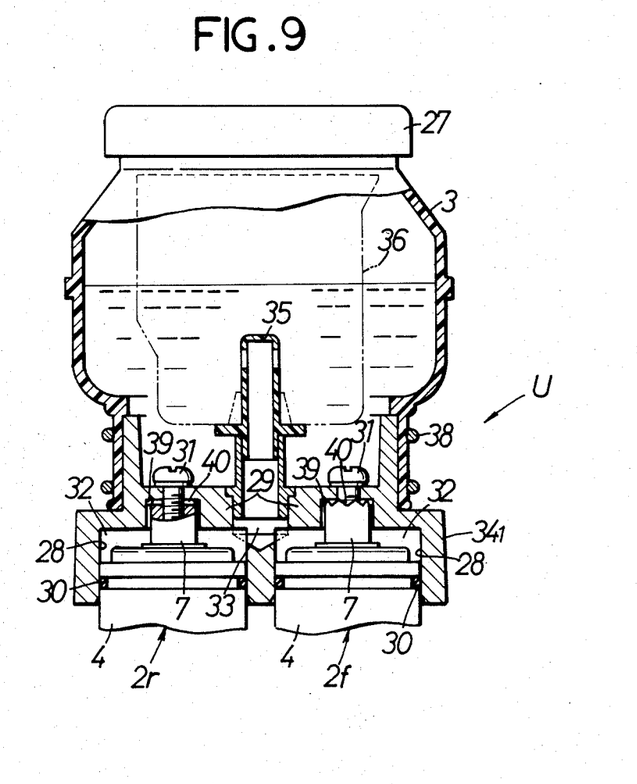
FIG. 9 is a third embodiment of the invention, showing a fragmentary front view with a main portion in cross section.

FIG. 9 shows a third embodiment of the invention. In FIG. 9 the oil tank 3 is made of a synthetic resin with its bottom opened, and a metallic reinforcing ring $34_1$ is fitted into the opened bottom portion. The inside ring $34_1$ and the outside lower portion of the oil tank 3 are fixed together by bands 38. The reinforcing ring $34_1$ is provided with support holes 28 and 28 which are fitted on the upper sections of the electro-magnetic valves and also provided with connecting walls 29 and 29 which are connected to the upper projecting shafts 7 and 7 by means of machine screws 31 and 31. The reinforcing ring $34_1$ in this embodiment has the same function as the reinforcing ring 34 in the first embodiment of the invention.

The abutment faces between the connecting walls 29 and 29 and the upper faces of the upper projecting shafts 7 and 7 are provided respectively with butt-serrations 39 and 40 which engage each other. With the engagement of this type, rotation of the electro-magnetic valves 2f and 2r is prevented during tightening of the screws 31, 31, rendering such tightening work reliable, even if the electro-magnetic valves 2f and 2r are supported rotatably on a support base (not shown).

Other construction of this embodiment is the same as that of the first embodiment, and in FIG. 9 parts corresponding to those of the first embodiment are given the same reference characters and numerals.

What is claimed is:

1. A control unit for antilock brake systems, comprising a support base provided with an oil channel, an oil tank, and an electro-magnetic valve having openings in communication with said oil channel and said oil tank, respectively, said valve being supported on said support base and in turn supporting said oil tank thereon, wherein a support hole and a connecting wall covering said support hole are formed in a bottom wall of said oil tank, said support hole being oil-tightly fitted around an upper end section of said electro-magnetic valve while said connecting wall being connected by screw means to a projecting shaft which is provided projectingly on an end face of the upper end section of said electro-magnetic valve, and wherein said connecting wall is provided with a throughhole communicating an inside of said oil tank to said electro-magnetic valve.

2. A control unit for antilock brake systems according to claim 1, wherein said projecting shaft and said connecting wall have abutment faces which engage with each other, butt-serrations being cut on the respective abutment faces.

3. A control unit for antilock brake systems according to claim 1, wherein said electro-magnetic valve is supported on said support base irrotatably relative to the latter.

4. A control unit for antilock brake systems according to claim 1, 2 or 3, wherein a plurality of said electro-magnetic valves are installed, and at the bottom wall of said oil tank are formed a plurality of said support holes and a plurality of said connecting walls correspondingly in number to the valves.

5. A control unit for antilock brake systems according to claim 4, wherein said oil tank is made of a synthetic resin, and to a lower end of said oil tank is fixed a metallic reinforcing ring so as to be fitted to and interconnect the upper end sections of said electro-magnetic valves.

6. A control unit for antilock brake systems according to claim 5, wherein said reinforcing ring is inserted into the lower end of said oil tank.

7. A control unit for antilock brake systems according to claim 5, wherein said reinforcing ring is fitted to the lower end of said oil tank and is tightly fixed thereto by a band.

8. A control unit for antilock brake systems according to claim 1, 2 or 3, wherein said support base is provided with a support hole opening at an upper face of said support base, said electro-magnetic valve is provided with a restraining face facing upwards which is located flush with or below the upper face of said support base in a state where the valve is fitted at a lower end section thereof into said support hole of said support base and wherein a pressing plate for retaining said restraining face in place is fastened to the upper face of said support base by means of bolts.

9. A control unit for antilock brake systems according to claim 8, wherein said restraining face is an upper face of a flange formed integrally on a body of said electro-magnetic valve.

10. A control unit for antilock brake systems according to claim 8, wherein said restraining face is an upper face of a circlip retained to a body of said electro-magnetic valve.

11. A control unit for antilock brake systems, comprising a support base provided with a high pressure oil channel leading to a hydraulic pressure source and with a control oil channel for introducing an oil pressure to a pressure reduction control chamber operable for reducing braking force of a wheel brake, and an electro-magnetic valve provided with an inlet valve of normally closed type having an inlet and an outlet respectively connected to said high pressure oil channel and said control oil channel, said valve being fastened to said support base through a fastening means, wherein said electro-magnetic valve has a lower end section thereof fitted oil-tightly into a support hole with a bottom which hole is formed in the support base and opens to an upper face of said support base, said high pressure oil channel is opened to a bottom face of said support hole and is fitted oil-tightly with a projecting shaft which is projectingly provided on the lower end section of said electro-magnetic valve and which has said inlet of the inlet valve formed open at an end face thereof, said outlet and said control oil channel are placed in mutual communication through an annular oil chamber defined in said support hole so as to surround said projecting shaft, and wherein a pressure receiving area of said projecting shaft as exposed to said high pressure oil channel is set smaller than a pressure receiving area of said electro-magnetic valve which is exposed to said annular oil chamber.

12. A control unit for antilock brake systems, comprising a support base provided therein with an oil channel, an oil tank, and a plurality of electro-magnetic valves which have respective openings in communication with said oil channel and said oil tank, said valves being supported on said support base and in turn supporting said oil tank thereon, wherein said oil tank is made of a synthetic resin, and to a lower end section of said oil tank is fixed a metallic reinforcing ring which is fitted around upper end sections of said plurality of electro-magnetic valves to interconnect those valves.

13. A control unit for antilock brake systems according to claim 12, wherein said reinforcing ring is inserted into the lower end section of said oil tank.

14. A control unit for antilock brake systems according to claim 12, wherein said reinforcing ring is fitted to the lower end section of said oil tank and is tightly fixed thereto by a band.

15. A control unit for antilock brake systems, comprising a support base provided therein with an oil channel and an electro-magnetic valve provided with an opening communicating with said oil channel and supported on said support base, wherein said support base is provided with a support hole opening to an upper face of said support base;

said electro-magnetic valve, which is fitted at a lower end section thereof into said support hole, is provided with a restraining surface facing upwards which is located flush with or below the upper face of said support base; and a pressing plate which retains said restraining face in place is fastened by means of bolts to the upper face of said support base.

16. A control unit for antilock brake systems according to claim 15, wherein said restraining face is an upper face of a flange integrally formed on a body of said electro-magnetic valve.

17. A control unit for antilock brake systems according to claim 15, wherein said restraining face is an upper face of a circlip retained to a body of said electro-magnetic valve.

* * * * *